United States Patent [19]

Cotter

[11] Patent Number: 4,797,818
[45] Date of Patent: Jan. 10, 1989

[54] FOOD ORDER/DELIVERY SYSTEM
[75] Inventor: Jeffrey J. Cotter, Orlando, Fla.
[73] Assignee: Jeno F. Paulucci, Sanford, Fla.
[21] Appl. No.: 30,878
[22] Filed: Mar. 26, 1987
[51] Int. Cl.⁴ ............................................. G06F 15/21
[52] U.S. Cl. .................................................... 364/401
[58] Field of Search ................. 364/401; 235/381, 383

[56] References Cited

U.S. PATENT DOCUMENTS 4,128,757 12/1978 Garner .................................. 235/383
4,388,689  6/1983 Hayman ............................... 364/401
4,567,359  1/1986 Lockwood ........................... 235/381

OTHER PUBLICATIONS

A Haas, "Pizza Wars", U.S. Air Magazine, Apr. 1988, pp. 79–85.

Primary Examiner—Jerry Smith
Assistant Examiner—Steven G. Kibby
Attorney, Agent, or Firm—Willian Brinks Olds Hofer Gilson & Lione Ltd.

[57] ABSTRACT

A computerized order/delivery system for use in the food service industry includes a central computer that accepts customer food orders and, based on a customer identifier, automatically selects the store that is to prepare the food and transmits the required information to that location.

7 Claims, 6 Drawing Sheets

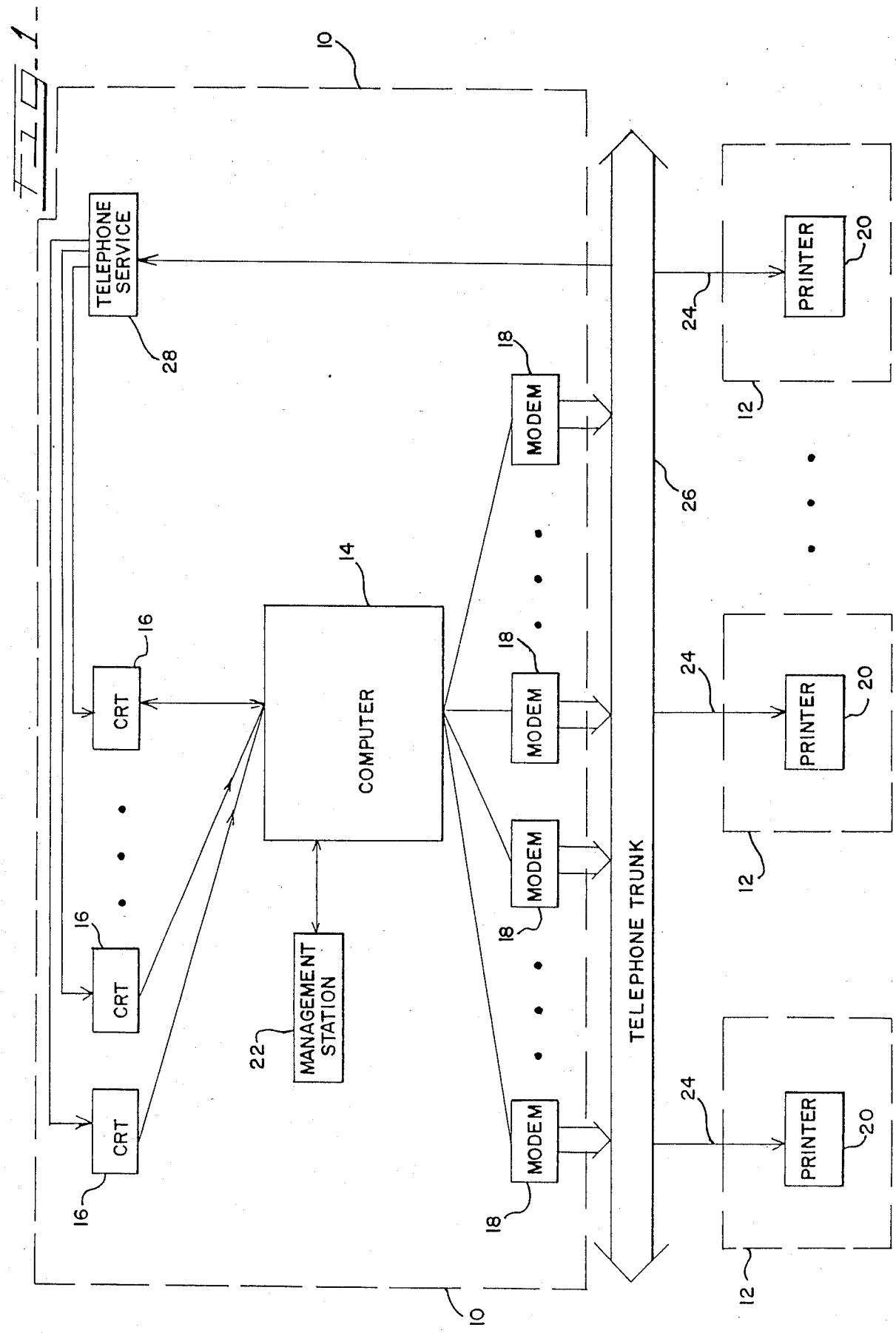

FIG. 2

```
*************************** PIZZA KWIK *******************************
***********************************************************************
************************ STREET MAINTENANCE SCREEN ********************
***********************************************************************

Street Name:           [                              ]
        Store Code:            [    ]
        Street Range Start:    [0         ]
        Street Range End:      [0         ]
        Map Location:          [    ]

***********************************************************************
****************** Copyright 1986 -- Profit Masters, Inc. *************
***********************************************************************
```

FIG. 3

```
**************** Pizza Kwik -- Pizza Order/Customer Screen ************
  Phone #    [        ]—35                   Order Taken By : [       ]
  Void/Cancel[ ]    F-U [ ]    Order Info: Date [00/00/00]  Time [    ]
  Delivery   [ ]  Time [     ]  Check? [ ]    Sent?   [ ]  Trans# [  0]
  Lastname   [                 0]—40              ] , First [          ]
  Address    [                                          Apt/Suite # [  ]
  City       [          ]  Zipcode [        ]
  Directions [                                   —42                   ]
              Mult. Order [ ]    Store Code [  ]
  Cokes      [ 0]  Diet Cokes [ 0]  Cherry Cokes [ 0]  Sprites  [ 0]
  Pizza Type [ ]   Coupon      [  ]  Total Items  [ 0]  Soda Amt. [ $0.00]

Extra Cheese [ ]  Grn. Pepper [ ]  Jalepeno  [ ]  Pizza Amt.  [ $0.00]
  Pepperoni    [ ]  Beef        [ ]  Pineapple [ ]  Coupon Amt.   $0.00
  Sausage      [ ]  Ham         [ ]  Anchovie  [ ]  Discount      $0.00
  Mushroom     [ ]  Blk. Olive  [ ]  Sauce     [ ]  Subtotal   [ $0.00]
  Onion      —[ ]  Grn. Olive  [ ]  Thick Crust [ ]  Total w/Tax  $0.00
         30
  ****************** Copyright 1986 -- Profit Masters, Inc. ***********
```

FIG. 4

```
***********************************************************************
******************** MASTER STREET LIST -- 02/28/87 *******************
=======================================================================
Street Name                      Map    Start    Stop   Delivering Store
-----------------------------------------------------------------------
GASLIGHT APTS                                           001 - ALOMA
GASLIGHT CR                      BE04                   001 - ALOMA
GASLIGHTS APTS                                          001 - ALOMA
GASPARILLA                       DD05                   005 - CURRYFORD
GASPARILLA AV                    DD05                   005 - CURRYFORD
GASTON FOSTER RD                 DD02                   005 - CURRYFORD
GATE AV                                                 005 - CURRYFORD
GATE TREE                                               010 - LONGWOOD
GATEHOUSE CT                                            006 - LAKE MARY/SANFORD
GATEHOUSE DR                     BD12                   010 - LONGWOOD
GATEWOOD DR                                             005 - CURRYFORD
GATLIN AV                        DA04            2300   008 - O.B.T.
GATLIN AV                        DD04    1200    5000   005 - CURRYFORD
GATLIN AV                        DD04    3500    5500   005 - CURRYFORD
GATLIN GROVE DR                  DC05                   005 - CURRYFORD
GATLIN GROVE RD                  DC05                   005 - CURRYFORD
GATLIN OAKS LN                   DD05                   005 - CURRYFORD
```

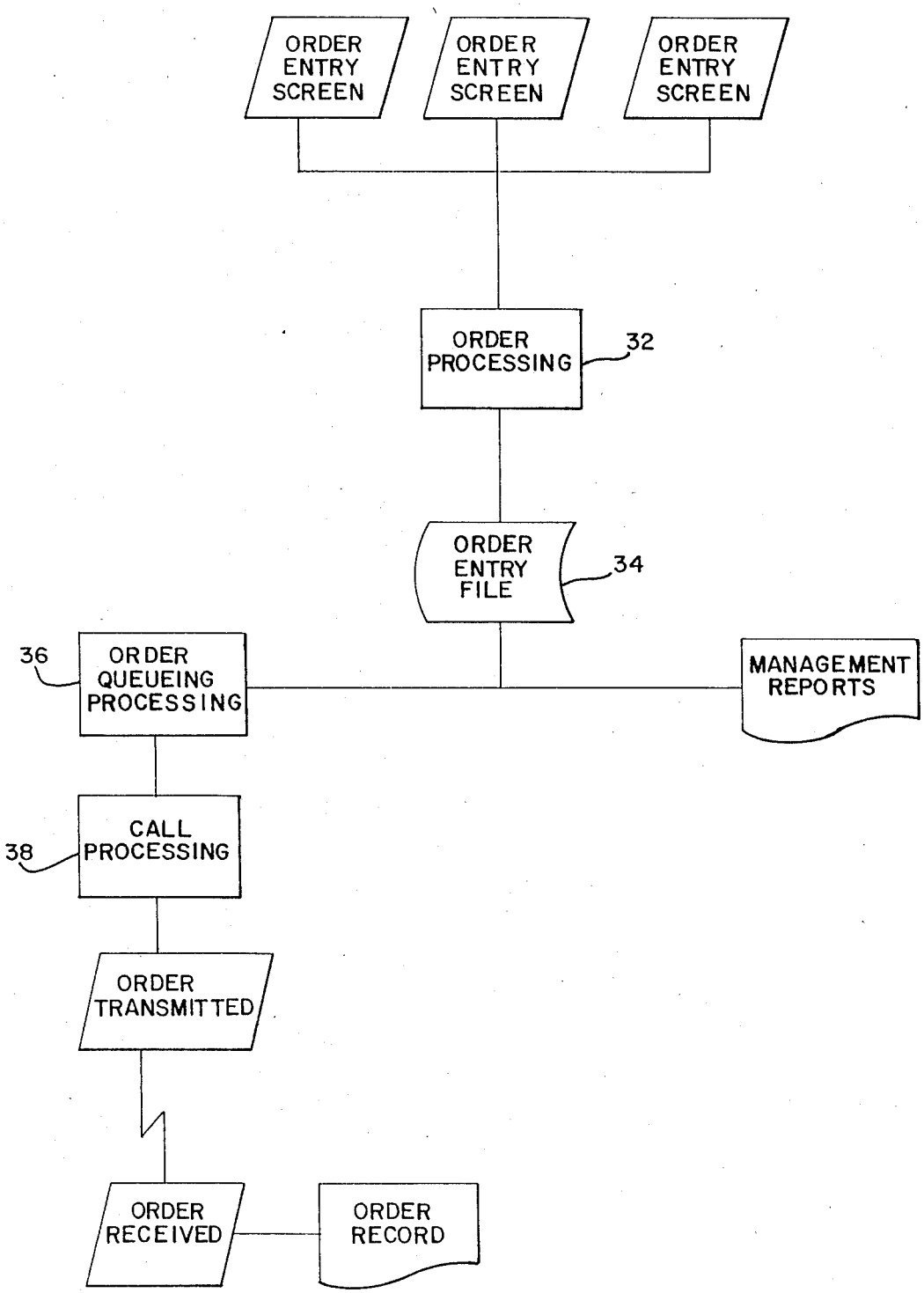

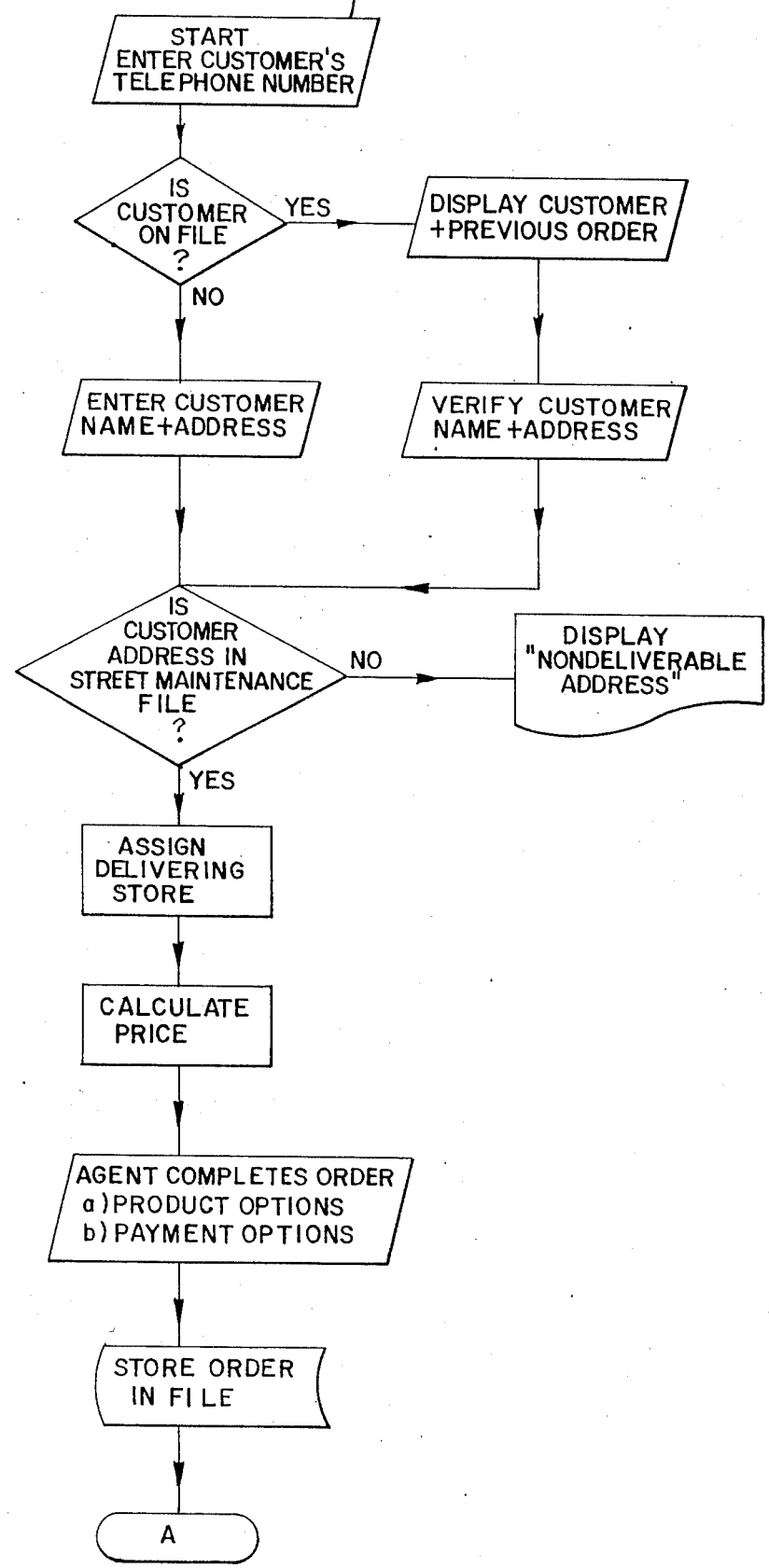

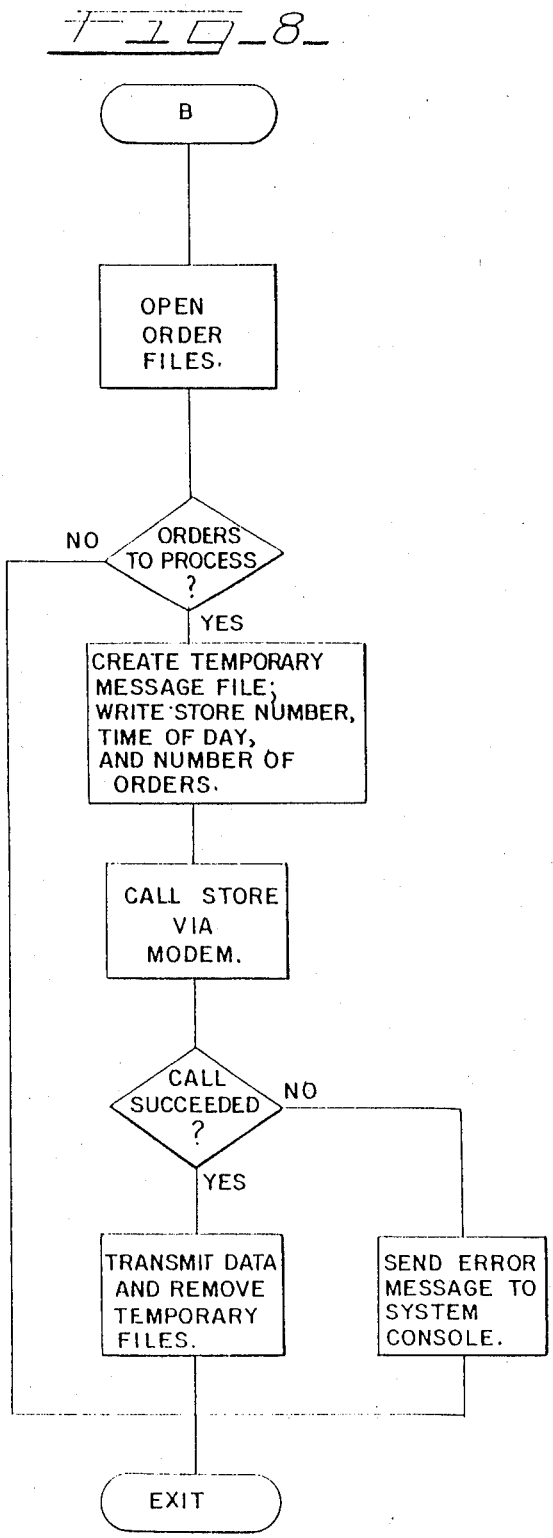

FOOD ORDER/DELIVERY SYSTEM

FIELD OF THE INVENTION

The invention relates to automated order/delivery systems in general, and in particular to automated food order/delivery systems that include related businesses catering to customers who eat at home.

BACKGROUND OF THE INVENTION

It has become common practice for consumers to "order out" for food, e.g., pizza, have it delivered to their homes, and "dine in." Historically, the suppliers of pizza have tended to occupy only one location, and a customer's choice of a particular pizzeria has usually been based upon the quality of food and the time within which his order can be filled. In the case of franchised suppliers that provide a uniform quality of pizza, once the customer has selected a franchise, his principal consideration is the response time of the store that actually fills his order.

In those areas having more than one franchised supplier, customers typically call the location closest to their home to achieve the quickest response to their order. However, physical proximity of the store to the customer may not always be the determinative criterion. Considerations such as time of day, local traffic patterns, road construction, etc., may affect the day to day ability of the closest store to serve a particular customer. Thus a customer may mistakenly select a store that is incapable of filling his order in a timely manner.

Each franchised supplier typically subscribes to a relatively expensive telephone service that enables incoming calls to be queued for answering on a first-in-first-out basis. The employees of the franchised store are typically occupied with the preparation and delivery of the food and may, especially during peak demand hours, become too busy to answer the telephone in a timely manner to receive orders. Consequently, customers may be put on hold for unacceptable periods of time.

SUMMARY OF THE INVENTION

The invention relates to an order/delivery system by which a number of affiliated stores all receive customer orders from a central location. A computer at the central location is programmed to receive customer orders, automatically assign a particular order to a particular store based upon a predetermined market allocation, and transmit the order to that store. The invention eliminates the need for expensive telephone service to each of the stores and frees the store employees from answering the telephone to take orders, thereby enabling those employees to concentrate on the preparation and delivery of the food.

BRIEF DESCRIPTION OF THE DRAWINGS

FIG. 1 is a block diagram of an automatic order/delivery system that incorporates a presently preferred embodiment of the invention.

FIG. 2 is a data entry screen displayed by the terminals used in the presently preferred embodiment of the invention.

FIG. 3 is a second data entry screen displayed by the terminals used in the presently preferred embodiment of the invention.

FIG. 4 is a partial listing of a master street list used in the presently preferred embodiment of the invention.

FIG. 5 is a flowchart describing the steps performed by the presently preferred embodiment of the invention.

FIG. 6 is a detailed flowchart describing the order processing step depicted in FIG. 5.

FIG. 8 is a detailed flowchart describing the call processing step depicted in FIG. 5.

DETAILED DESCRIPTION OF THE PRESENTLY PREFERRED EMBODIMENT

Figure 7:
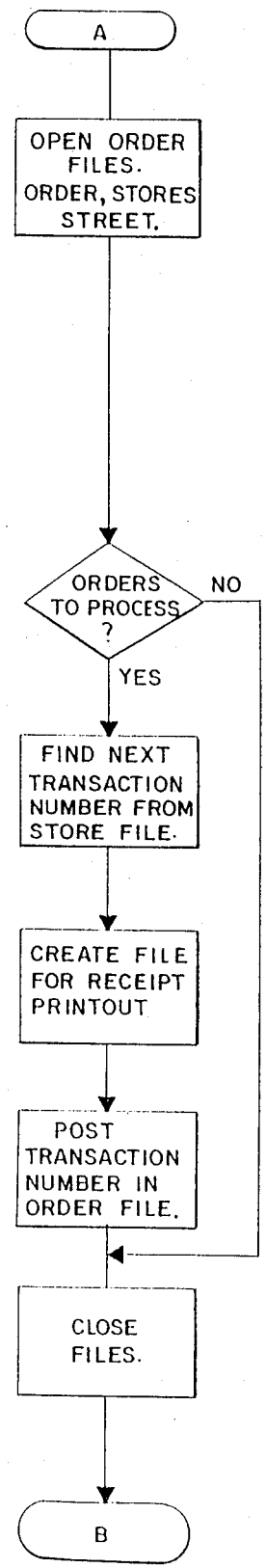
FIG. 7 is a detailed flowchart describing the queuing processing step depicted in FIG. 5.

As used herein, the term "store" is used in a broad sense, and is meant to include restaurants, kitchens or any other commercial business that prepares food. A store may or may not have a delivery service associated with it and includes "take out" establishments that may or may not have dining facilities.

FIG. 1 depicts a telephone center 10 located in a municipality or other region served by a number of related or franchised stores 12. The telephone center 10 houses operators that enter information into a computer system adapted to automatically assign incoming orders to the store best able to respond to those orders. Often, the assigned store will be the one nearest the customer's residence, however, local factors such as traffic patterns, time of day and road construction may dictate that a store other than the nearest one will provide optimum service.

The aforementioned factors are taken into account in the programming of the computer. Initially, the region to be served by the system is divided into market areas, each of which is to be served by a particular store. This market allocation can be defined in any number of ways, such as by zip code, telephone area code or exchange number or by street address. All that is required is that each potential customer within the service region is assigned to a store. In the presently preferred embodiment, the software includes a street maintenance file containing an entry for each street in the region. Each entry contains a range of addresses to be served by a particular store which is assigned a numerical code. In residential areas, an entire street may be assigned to one store, while major thoroughfares that traverse a number of market areas may be served by several stores. The market allocation data is stored on magnetic disk or other acceptable storage device that can be accessed by the system operating software. The street maintenance file is periodically updated to take into account shifting market shares of particular stores, local road construction, the addition of new housing developments and the like. FIG. 2 depicts a sample data entry screen that can be used to enter the market allocation data. FIG. 4 is a partial listing of a street maintenance file used in the presently preferred embodiment.

The telephone center 10 includes a central computer 14, a plurality of interactive display devices such as CRTs 16, and a plurality of modems 18 adapted to communicate with remote devices such as printers 20 over a standard telephone line. The telephone center 10 also includes a generator or other source of back-up power (not shown) so that the system remains operational in the event of a power failure. Since telephone service often remains operational despite area-wide power outages, customers can be served under less than ideal conditions.

The telephone center 10 also contains a station 22 that is normally used by management to monitor the activity of the system including cash flow, number of orders, inventory and any other information contained in the database.

FIG. 1 shows several CRTs 16 and modems 18. Ideally, there should be one modem per CRT, however, this is not absolutely necessary. The required number of either device is dictated by the number of calls the telephone center is expected to handle.

Each store 12 within the service area contains a printer 20 designed to receive messages from the telephone center 10. In the preferred embodiment, communication is provided via telephone line 24 from a modem 18 at the telephone center 10, however, other methods of communication are possible. For example, order information could be transmitted from the telephone center to the stores via satellite or radio.

There is no relationship between the number of modems 18 and printers 20. As depicted in FIG. 1, the modems have access to the entire range of telephone numbers in the local telephone network or trunk line 26, and can therefore address any of the printers 20, however, any particular printer can be accessed only on a single line 24. The expensive prior art telephone service used at the store can be replaced by a single line for intracompany use. In practice, the public is made aware that a single telephone number, the number of the telephone center, is to be used when ordering from the system. The telephone numbers of the individual stores are not available to the public to ensure use of the central number.

The computer 14 is programmed to accept the customer's address and order from the CRTs 14, access the market allocation database, identify the correct store, and transmit the order to that store. The software includes a number of files which can be cross-referenced. In the preferred embodiment, customer files are initially accessed by the customer's telephone number. The telephone number can be cross-referenced to an identifier that is used to access the market allocation data base. In the presently preferred embodiment, this identifier is the customer's home address, however, the customer's zip code, area code or telephone exchange number could also be used. The identifier is used to define the store that is to receive the order. The code representing that store is then cross-referenced to the telephone number of the modem that is to receive the order. This file manipulation is accomplished by a relational database, such as the Informix Relational Database System marketed by Informax Systems, Inc. A program listing of software capable of performing such functions is contained as an appendix in the original patent file maintained in the United States Patent and Trademark Office.

In operation, a customer desiring a pizza, or any other type of food provided by the supplier, dials the number of the telephone center 10. The incoming call is automatically assigned to an available operator at one of the CRTs 16 by the telephone service 28 employed by the center. It has been determined that the Merlin System supplied by AT&T can be used to provide this service.

Once the system is initialized, the CRTs display an order entry screen such as shown in FIG. 3. The screen consists of a number of bracketed fields 30 that correspond to individual items of information such as name, address, date and menu selections. Cursor controls located on the CRT enable the operator to selectively enter the customer information in the appropriate field. Since the speed with which a customer's order can be taken is important, the software automatically performs data processing upon exiting certain fields.

The automatic steps taken by the system can best be understood with reference to FIG. 5. Customer order information is entered, and the store assigned by the order processing subroutine 32 and stored as a file 34. Order queuing processing subroutine 36 and call processing subroutine 38 then act upon the file to generate an order that is transmitted to the assigned printer. FIGS. 6-8 are detailed flowcharts of the order processing, order queuing and call processing subroutines respectively. As shown in FIG. 6, the operator requests the customer's telephone number, and enters that information in the appropriate data field displayed by the terminal. The operator then directs the computer to search its customer files by depressing the appropriate CRT key. In the preferred embodiment, this search is performed whenever the operator exits the phone number data field 35 (see FIG. 3).

If the customer is in the file, the terminal automatically displays a completed data entry screen including the customer's home address and last order. If the order is to be changed, the operator enters the menu selections accordingly. Upon exiting the last field corresponding to a menu selection, the software accesses price maintenance files and calculates the total cost of the order.

If the customer is not already on file, the operator enters the customer's name and address. The computer is programmed to immediately identify whether the caller is in an area served by the system. A street address is entered, followed by the street name. Upon exiting the street name data field 40 (FIG. 3), the computer searches its database. If the street is not found in the street maintenance file, the CRT displays an appropriate message. If the caller is at a deliverable address, the data entry screen is updated to include the store code 42 of the preassigned store.

When all the information has been entered, the customer order is stored in the computer with the appropriate keyboard entry. Once stored, the order information is accessible to report generating subroutines used by management to monitor, for example the number of pizzas ordered, what toppings are used and how many beverages are sold. Upon the entry of the order information, the CRT is free to accept additional orders. It should be noted that while the presently preferred embodiment contemplates operator assisted order entry, other methods are within the scope of the invention. For example, the telephone center may be equipped with voice recognition circuitry capable of accepting verbal instructions. Alternatively, order information may be entered by the customer using telephone touch tone capabilities available in many areas.

The completion of the order activates the queuing processing subroutine 36. As shown in FIG. 7, this subroutine opens the file, and determines which store has been assigned to receive the order. It then assigns a sequential transaction number for the assigned store and creates a file for the receipt that is to be transmitted for printout at the store. The transaction number is added to the file and permanently stored with the order data when the file is closed. When the customer calls at a later date, the transaction number will appear in the data entry screen generated in response to his telephone number. The order containing the transaction number is placed in a temporary file which is accessed periodically by the call processing subroutine 38 that is resident in the computer. That subroutine directs a modem 18, in a known manner, to dial the telephone number assigned to the selected store code and transmit the order. The basic steps performed by the subroutine are described in FIG. 8.

At the assigned store, the order is automatically printed out and the food is prepared and delivered in accordance with the transmitted instructions. The employees are thereby freed from answering the phone to take orders and can devote their time to the production and delivery of the pizzas.

The advantages of the system are many. Because all orders in the network are stored in the computer, management personnel at the central location can monitor inventory and cash flow at particular stores or throughout the system. The instant access provided by the computer allows early detection of inventory shortages, waste of ingredients through overgenerous food preparers, and can be used to detect accounting discrepancies and discourage embezzlement of funds at any particular store.

It has been determined that an AT&T Model 3B2/400 computer with a hard disk in combination with the appropriate software, a Televidio Model 955 Terminal and a Paradyne Model FDX 1200. (or Model FDX 2400+) modem can accomplish the claimed features of the telephone center 10, although any commercially available hardware should suffice. Model DX 2100 printers may be used at the stores, although other commercially available printers are also acceptable.

Those skilled in the art will appreciate that the system can be used in a number of applications, and is not limited to the preparation and delivery of pizza.

I claim:

1. A system for receiving orders for food at a central location and transmitting said orders to a preselected remote store for preparation of said food comprising:
   means at said central location for storing market allocation data in the form of a software database;
   means at said central location for receiving customer order data;
   means at said central location for automatically comparing said customer order data with said market allocation data and for automatically selecting a particular store to receive said order data on the basis of said comparison;
   means at said central location responsive to said means for comparing and selecting for automatically transmitting said order data to said selected store; and
   means at said selected store for automatically receiving and displaying said order data.

2. The system of claim 1 wherein said means for automatically comparing and automatically selecting comprises a digital computer.

3. The system of claim 1 wherein said means for automatically transmitting comprises a modem.

4. The system of claim 1 wherein said means for automatically receiving and displaying comprises a printer.

5. A system for communicating with a plurality of remote stores from a central location comprising:
   means at said central location for storing market allocation data in the form of predetermined pairs of customer identifiers and store codes;
   means at said central location for receiving customer order information in the form of a customer identifier and menu selection;
   means at said central location for automatically comparing said received customer identifier with the customer identifiers of said market allocation data;
   means at said central location for automatically selecting the market allocation data containing the identifier that matches the received customer identifier;
   means at said central location for automatically transmitting the menu selection to the store represented by the store code of the selected market allocation data; and
   means at said store for receiving and displaying said menu selection.

6. A system for communicating with a plurality of remote locations from a central location comprising:
   a computer at said central location including means for storing market allocation data in the form of predetermined pairs of customer identifiers and store codes:
   a modem at said central location connected to said computer and responsive thereto and adapted to transmit data over telephone lines; and
   a plurality of printers, at least one of said printers located at each of said remote locations, and each adapted to receive said data transmitted from said modem;
   said computer being programmed to receive customer order information in the form of a customer identifier and menu selection, retrieve said market allocation data from said means for storing, compare said customer identifier with the customer identifiers of said market allocation data, and, based on said comparison, cause said modem to transmit said menu selection to a selected store.

7. The system of claim 6 further including means at said central location for providing back-up power to said computer and modems in the event of power loss.

* * * * *